US012749271B1

(12) United States Patent
Jiao

(10) Patent No.: US 12,749,271 B1
(45) Date of Patent: Sep. 29, 2026

(54) SYSTEM TO COMBINE IMAGES USING AUGMENTED REALITY MARKERS

(71) Applicant: AMAZON TECHNOLOGIES, INC., Seattle, WA (US)

(72) Inventor: Alex Jiao, Shoreline, WA (US)

(73) Assignee: Amazon Technologies, Inc., Seattle, WA (US)

( * ) Notice: Subject to any disclaimer, the term of this patent is extended or adjusted under 35 U.S.C. 154(b) by 139 days.

(21) Appl. No.: 18/677,116

(22) Filed: May 29, 2024

(51) Int. Cl.
*G06T 19/00* (2011.01)
*G06V 10/764* (2022.01)

(52) U.S. Cl.
CPC .......... *G06T 19/006* (2013.01); *G06V 10/764* (2022.01)

(58) Field of Classification Search
CPC .......... G06F 3/012; G06F 3/011; G06F 3/013; G06F 3/017; G06T 19/006; G06T 19/20; G06T 11/60; G06T 19/00; G06T 2200/24; G06V 20/20; G06V 40/20; G06V 10/25
See application file for complete search history.

(56) References Cited

U.S. PATENT DOCUMENTS 12,315,071 B1 * 5/2025 Johnson .................. G06T 19/20
2017/0277256 A1 * 9/2017 Burns ..................... G06F 3/013
2017/0357333 A1 * 12/2017 Balan .................... A63F 13/211
2019/0306419 A1 * 10/2019 Kajiwara ............... H04N 23/50
2022/0070426 A1 * 3/2022 Sinharoy .............. H04N 13/111

OTHER PUBLICATIONS

"ARCore", Google, 8 pgs. Retrieved from the Internet: URL: https://developers.google.com/ar/.
"ARKit", 4 pgs. Retrieved from the Internet: URL: https://developer.apple.com/augmented-reality/arkit/.
"Basic concepts of the homography explained with code", OpenCV, 14 pgs. Retrieved from the Internet: URL: https://docs.opencv.org/4.x/d9/dab/tutorial_homography.html.
"Basics of AR: Anchors, Keypoints & Feature Detection", Aug. 6, 2018, 24 pgs. Retrieved from the Internet: URL: https://www.andreasjakl.com/basics-of-ar-anchors-keypoints-feature-detection/.
(Continued)

*Primary Examiner* — Xilin Guo
(74) *Attorney, Agent, or Firm* — Athorus, PLLC

(57) ABSTRACT

Sky obstructions that may affect satellite communication are determined using images acquired at a proposed antenna location. Images capturing a different portion of a scene are combined to provide a representation of the sky. Images acquired at different camera poses are processed by an augmented reality (AR) module to determine a plurality of AR markers for each image. Each AR marker represents a particular point in space in a virtual field-of-view (VFOV) and has a unique identifier. A plurality of common AR markers between an image and the VFOV allow a relationship between the two to be determined. Images may be processed individually before projection, such as to determine segmentation data. The image or resulting segmentation data may then be projected, using the relationship, onto the VFOV forming combined data. The combined data may be processed to determine sky obstructions that would affect line-of-sight communication.

20 Claims, 12 Drawing Sheets

(56) References Cited

OTHER PUBLICATIONS

"Features2D + Homography to find a known object", OpenCV, 3 pgs. Retrieved from the Internet: URL: https://docs.opencv.org/3.4/d7/dff/tutorial_feature_homography.html.
"Fundamental concepts", Google, Oct. 11, 2023, 5 pgs. Retrieved from the Internet: URL: https://developers.google.com/ar/develop/fundamentals.
"Sky-Detector", Github, 3 pgs. Retrieved from the Internet: URL: https://github.com/cftang0827/sky-detector.
Shen, et al., "Sky Region Detection in a Single Image for Autonomous Ground Robot Navigation", Jul. 30, 2013, 13 pgs. Retrieved from the Internet: URL: https://journals.sagepub.com/doi/pdf/10.5772/56884.

* cited by examiner

SYSTEM TO COMBINE IMAGES USING AUGMENTED REALITY MARKERS

COMPUTER PROGRAM LISTING APPENDIX

This disclosure incorporates by reference the material submitted in the Computer Program Listing Appendix filed herewith including filename 905-7047_ANSI with a file creation date of May 29, 2024, and size of 11,981 bytes. The material within the Computer Program Listing Appendix is Copyright 2024 Amazon Technologies, Inc. or its affiliates, all rights reserved.

BACKGROUND

A constellation of satellites may provide communication services to many user terminals. Installation of these user terminals may take into consideration obstructions of the sky that could impair line-of-sight radio communication with the satellites.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
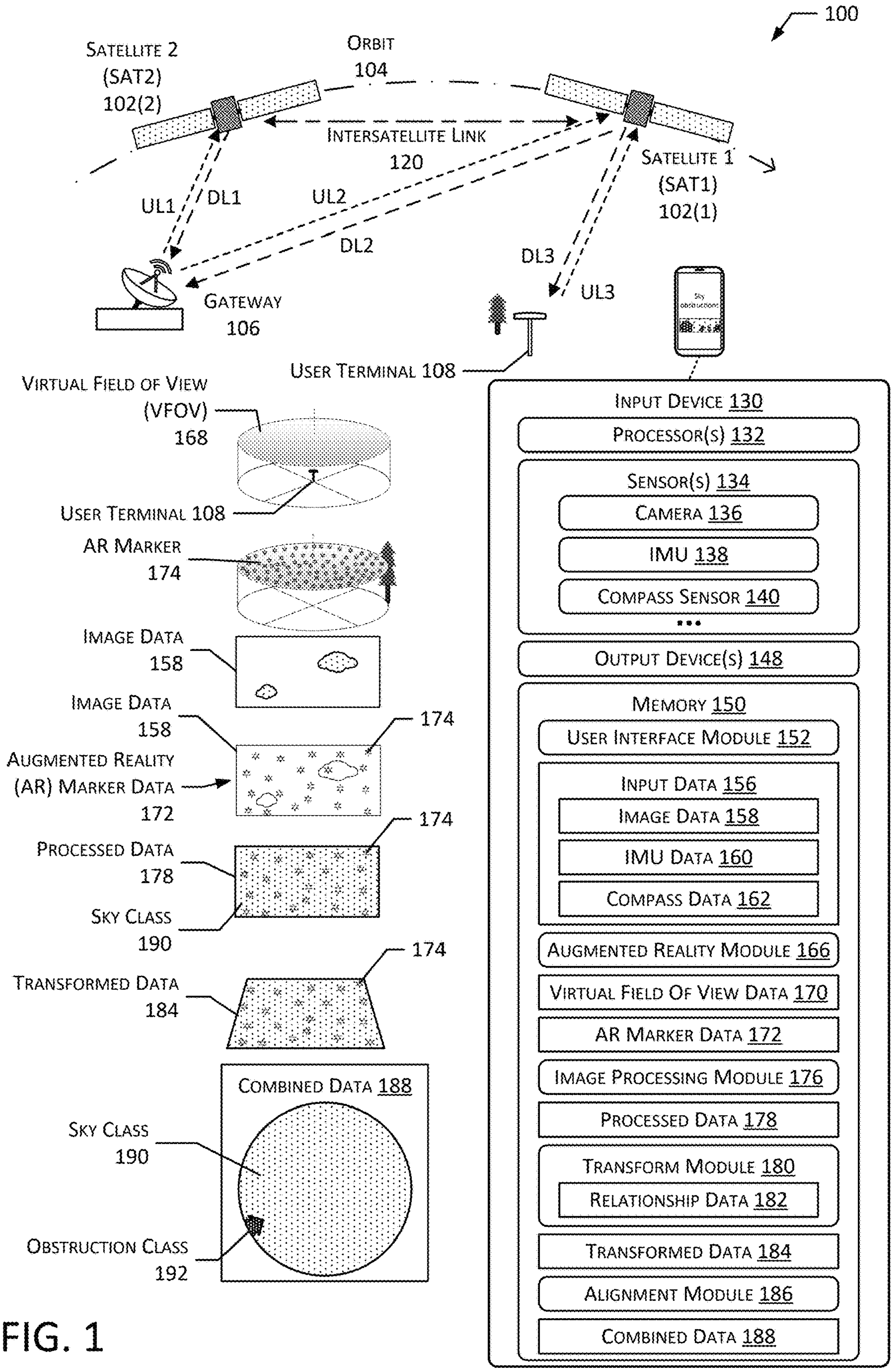
FIG. 1 illustrates a system that determines combined data using augmented reality markers, and using the combined data to determine sky obstructions associated with use of a constellation of satellites, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A communications system may utilize a constellation of satellites to wirelessly transfer data between user terminals (UTs) and points of presence (POPs) that in turn connect to other networks, such as the Internet. Signals between the UT and the satellite are limited to travelling at the speed of light. The farther away a satellite is from the UT, the longer it takes for a signal to travel to the satellite and then travel back to Earth. For example, a hop (sending a signal to the satellite and back down to the ground, or vice versa) to a geosynchronous satellite introduces a delay of at least 240 milliseconds (ms). Additional delays due to signal processing, buffering, and so forth are also present. Such delays, or latency, are undesirable for many types of communication. For example, time-sensitive communication activities such as remote control of devices, industrial reporting and control, gaming, and so forth may be adversely affected by these latencies. In comparison, a hop involving a non-geosynchronous orbit (NGO) satellite at an altitude of 600 km only introduces about 4 ms of latency comprising 2 ms up to the satellite and 2 ms down to the UT. As a result, compared to using geosynchronous satellites, the use of NGO satellites significantly reduces latencies due to signal travel times.

In addition to improved latency, use of a constellation of many NGO satellites offers other significant benefits compared to a geosynchronous satellite. Shorter distances between the UT and the satellite allow for increased UT density by allowing greater frequency re-use and sharing. Power and antenna gain requirements for both the UT and the satellites are also reduced due to the shorter distances. This allows for relatively smaller and less expensive individual satellites to be used. However, due to their orbits, the apparent position in the sky of the NGO satellites are constantly changing, relative to the UT.

The frequencies used by the constellation to communicate may require an unimpeded line-of-sight between the satellite and the UT. The presence of an obstruction, such as a building or a tree, may block or attenuate radio signals, preventing or impairing communication. Traditionally, an installer would assess the potential mounting location for the antenna of the UT to determine whether local sky obstructions would impair operation. For example, an installation technician would consider where the antenna may be mounted to reduce obstruction of the signal by obstacles in the surrounding area. However, this assessment may be complicated and may not be easily duplicated by a new installation technician or an end user who is installing their UT for the first time.

Automated techniques may be used to determine and assess sky obstructions. For example, an image acquired in a particular position and direction may be semantically segmented into "sky" and "not sky" classes. The "not sky" class may be deemed to represent an obstacle that impairs communication, while the "sky" class may be deemed to represent clear line-of-sight with any satellites in that direction. Information about these sky obstructions may then be used to guide installation, such as assessing the suitability of a proposed installation location.

Traditionally such techniques utilize a smartphone or other device to acquire a series of images taken in different poses, providing a set of images that provide a representation of the sky and the surrounding physical space. Individual images acquired in such a fashion have traditionally been joined into a contiguous image, or "stitched" together, using only the features present in the images. This may be suitable for situations in which the images are rich in features, such as acquiring several photos of a cityscape. However, such techniques of feature-based image stitching fail in situations in which the images contain insufficient features. For example, a clear blue sky overhead may be featureless, causing image-based image stitching to fail in piecing together images of that clear blue sky. This can pose a problem in the ideal situation for installation in which there are no obstructions and the images are acquired on a clear day.

Described in this disclosure are systems and techniques for using augmented reality (AR) markers to determine combined data, such as a contiguous representation of the sky. A virtual field-of-view (VFOV) is specified. For example, the VFOV may comprise a circular horizontal plane that is at a specified height above a current position. AR markers are defined, each representing a particular point in space (with corresponding coordinates) within the VFOV and having a unique identifier. Input data is acquired using a plurality of sensors. For example, a camera may acquire image data while pose data is determined based on output from an inertial measurement unit (IMU) and compass. The pose data indicates the location and orientation of the camera at the time image data is acquired.

Augmented reality (AR) tools use the sensors onboard a device to relate computer-generated objects, such as markers, with a surrounding physical space. For example, AR tools may be used to overlay computer-generated objects onto an image acquired using a camera. By using the pose data associated with the image, these AR tools may be used to generate AR markers that are associated with a computer-generated surface described by the VFOV. After subsequent acquisition of image data, such as using a camera of the device, the AR tools are used to determine AR markers that are associated with the image data. For example, if a pose places the camera's field-of-view such that the acquired image encompasses a portion of the computer-generated surface described by the VFOV, the relative position of those AR markers that are within that image data may be calculated by the AR tools.

These AR markers, provided by the AR tools, are thus present within the VFOV and within those images that include at least a portion of the VFOV. Because each AR marker is unique, a plurality of these AR markers may be used to determine a relationship, such as a transform, between points in the image data and points in the VFOV. Once the relationship has been determined, the image may be transformed and projected onto the VFOV using the relationship. For example, a homography matrix may be calculated that relates coordinates in the image (such as row and column) to coordinates in the VFOV (such as a point at coordinates (x,y) on a flat plane or coordinates (x,y,z) on a non-planar surface. Continuing the example, based on the homography matrix, pixels within the image may be related to a corresponding location in the VFOV. As images are acquired in different poses, the VFOV may be populated with data from those images, providing combined data. This combined data may then be used. For example, the combined data may be used to determine sky obstruction data, indicating the location of obstacles that may block communication with the satellites during operation.

Image data may be processed in various ways, with the resulting processed data then projected onto the VFOV. In one implementation, the image data may be processed using a semantic segmentation model that determines a class for pixels in the image. For example, the semantic segmentation model may determine if a pixel is in a "sky" class or an "obstruction" class. This may be used to provide a binary image that distinguishes the two classes. The binary image may then be projected, using the relationship, onto the VFOV to determine the combined data. In some implementations, by performing the processing before combining the data, the introduction of artifacts at seams between images that may result from the projection may be minimized or eliminated. As a result, the analysis of the combined data may benefit from improved quality of data.

By using the techniques described in this disclosure, a plurality of instances of sensor data may be reliably combined to provide a representation of a physical space that is greater than what can be represented by a single instance. These techniques may be readily implemented on a portable device, such as a smartphone, tablet, and so forth, allowing use in a variety of locations. For example, an installer may utilize an application executing on a smartphone that performs the operations described herein, acquiring many images of the sky and surrounding physical space, and providing as output a combined representation of the sky and any local obstructions. This information may then be used to inform the placement of an antenna of a UT, such that the antenna affords a suitably obstacle-free view of the satellites in the constellation.

ILLUSTRATIVE SYSTEM

The ability to communicate between two or more locations that are physically separated provides substantial benefits. Communications over areas ranging from counties, states, continents, oceans, and the entire planet are used to enable a variety of activities including remote sensing, remote operation of devices, and so forth.

Communications facilitated by electronics use electromagnetic signals, such as radio waves or light to send information over a distance. These electromagnetic signals have a maximum speed in a vacuum of 299,792,458 meters per second, known as the "speed of light" and abbreviated "c". Electromagnetic signals may travel, or propagate, best when there is an unobstructed path between the antenna of the transmitter and the antenna of the receiver. This path may be referred to as a "line of sight". While electromagnetic signals may bend or bounce, the ideal situation for communication is often a line of sight that is unobstructed.

As height above ground increases, the area on the ground that is visible from that elevated point increases. For example, the higher you go in a building or on a mountain, the farther you can see. The same is true for the electromagnetic signals used to provide communication services. A relay station having a radio receiver and transmitter with their antennas placed high above the ground is able to "see" more ground and provide communication service to a larger area.

There are limits to how tall a structure can be built and where. For example, it is not cost effective to build a 2000 meter tall tower in a remote area to provide communication service to a small number of users. However, if that relay station is placed on a satellite high in space, that satellite is able to "see" a large area, potentially providing communication services to many users across a large geographic area. In this situation, the cost of building and operating the satellite is distributed across many different users and becomes cost effective.

A satellite may be maintained in space for months or years by placing it into orbit around the Earth. The movement of the satellite in orbit is directly related to the height above ground. For example, the greater the altitude the longer the period of time it takes for a satellite to complete a single orbit. A satellite in a geosynchronous orbit at an altitude of 35,800 km may appear to be fixed with respect to the ground because the period of the geosynchronous orbit matches the rotation of the Earth. In comparison, a satellite in a non-geosynchronous orbit (NGO) will appear to move with respect to the Earth. For example, a satellite in a circular orbit at 600 km will circle the Earth about every 96 minutes. To an observer on the ground, the satellite in the 600 km orbit will speed by, moving from horizon to horizon in a matter of minutes.

The altitude of an NGO is high enough to provide an individual satellite with a coverage of a relatively large portion of the ground, while remaining low enough to minimize latency due to signal propagation time. For example, the satellite at 600 km only introduces 4 ms of latency for a single hop. The lower altitude also reduces the distance the electromagnetic signal has to travel. This allows the satellite in NGO as well as the device communicating with the satellite to use a less powerful transmitter, use smaller antennas, and so forth.

The system 100 shown here comprises a plurality (or "constellation") of communication satellites 102(1), 102(2), . . . , 102(S), each communication satellite 102 being in orbit 104. Also shown is a gateway 106 and a user terminal (UT) 108. Once installed and operational, each UT 108 may be connected to one or more computing devices (not shown). Each computing device may execute one or more application modules. For example, the application modules may comprise email applications, telephony applications, videoconferencing applications, telemetry applications, remote sensing applications, telecontrol applications, and so forth.

The constellation may comprise hundreds or thousands of satellites 102, in various orbits 104. For example, one or more of these satellites 102 may be in non-geosynchronous orbits (NGOs) in which they are in constant motion with respect to the Earth, such as a low earth orbit (LEO). In this illustration, orbit 104 is depicted with an arc pointed to the right. A first satellite (SAT1) 102(1) is leading (ahead of) a second satellite (SAT2) 102(2) in the orbit 104.

With regard to FIG. 1, an uplink is a communication link which allows data to be sent to a satellite 102 from a gateway 106, UT 108, or device other than another satellite 102. Uplinks are designated as UL1, UL2, UL3 and so forth. For example, UL1 is a first uplink from the gateway 106 to the second satellite 102(2). In comparison, a downlink is a communication link which allows data to be sent from the satellite 102 to a gateway 106, UT 108, or device other than another satellite 102. For example, DL1 is a first downlink from the second satellite 102(2) to the gateway 106.

In some implementations, the satellites 102 may also be in communication with one another. For example, an inter-satellite link (ISL) 120 may provide for communication between satellites 102 in the constellation.

Each UT 108 comprises an antenna, such as a phased array antenna that is electronically steerable. For ease of discussion and not necessarily as a limitation, the UT 108 and the antenna may be described as a single unit. Due to the line-of-sight nature of the frequencies used, the antenna of the UT 108 will provide best coverage when there are no obstructions between the antenna and the satellite(s) 102 with which it is communicating. Some obstructions, such as trees, may attenuate signals passing through, reducing the signal strength at the receiver. In some circumstances this attenuation may impair communication. Some obstructions, such as buildings or mountains may block the signal entirely, preventing communication.

During installation of the UT 108, the installer would take into consideration sky obstructions that may impair communication. If possible, mitigating actions may then be taken. For example, a first proposed location for the UT 108 may have a portion of the sky blocked due to a nearby roof. Continuing the example, a second proposed location located several meters away laterally may not be so obstructed.

An input device 130 may be used to acquire data at a proposed location. The acquired data may then be processed and used to determine suitability of the proposed location. The input device 130 may comprise a dedicated device, smartphone, tablet computer, wearable device, and so forth. In some implementations the input device 130 may perform the operations described herein locally. In other implementation, the operations described may be perform on another computing device.

The input device 130 includes one or more hardware processors 132 (processors) configured to execute one or more stored instructions. The processors 132 may comprise one or more cores. The processors 132 may include micro-controllers, systems on a chip, field programmable gate arrays, digital signal processors, graphic processing units, general processing units, and so forth.

The input device 130 includes one or more sensors 134. The sensors 134 may comprise a camera 136, LIDAR, depth camera, stereocamera, and so forth. The camera 136 comprises an image sensing array that may be sensitive to one or more of visible light, infrared light, ultraviolet light, and so forth. During operation, the camera 136 generates image data 158 that is associated with a specified time interval. The LIDAR uses pulses of light in a beam that is scanned across a scene to determine a time of flight and thus distance to objects in the scene. The depth camera may use emitted light such as an infrared signal or may use a coded aperture to determine distance data indicative of a distance between the depth camera and objects in the scene. The stereocamera may use two or more cameras at a known distance from one another to determine a distance to features detected in images from both cameras to determine a distance to those features. The camera 136 or other sensors may provide as output an array of data, such as a two-dimensional array of rows and columns, with each element in the array comprising data such as intensity, color, distance, and so forth for that element. With regard to images, each element may be deemed a pixel.

The sensors 134 may comprise an inertial measurement unit (IMU) 138, tilt sensor, inclinometer, and so forth. The IMU 138 may comprise one or more accelerometers and gyrometers, and so forth. For example, the IMU 138 may comprise three accelerometers, each oriented to provide acceleration information with respect to a different one of three mutually-orthogonal axes. Continuing the example, the IMU 138 may comprise three gyrometers, each oriented to provide rotation information with respect to each of the three mutually-orthogonal axes. During operation, the IMU 138 generates IMU data 160 indicative of relative motion of the IMU 138. For example, the IMU data 160 may be indicative of accelerations and rotations occurring during a specified time interval. The IMU 138 may be affixed to a common structure with the camera 136. The IMU 138 may also provide information, such as an angle or tilt relative to local vertical due to gravity.

The sensors 134 may comprise a compass sensor 140. For example, the compass sensor 140 may comprise a fluxgate magnetometer that is used to detect the Earth's magnetic field and determine a magnetic heading. During operation the compass sensor 140 generates compass data 162 indicative of an orientation of the compass sensor 140 with respect to an external magnetic field, such as the Earth's terrestrial magnetic field, during a specified time interval. The compass sensor 140 may be affixed to a common structure with the camera 136.

The sensors 134 may include other sensors, such as a positioning system comprising a global navigation satellite system (GNSS) receiver or other device that provides position data indicative of a position such as latitude, longitude, and altitude. For example, the positioning system may comprise a Global Positioning System (GPS) receiver.

The sensors 134 may comprise other sensors such as switches, touch sensors, ambient light sensors, microphones, keyboard, and so forth.

For ease of discussion, and not necessarily as a limitation, the sensors 134 may be arranged into a first subset that are used to acquire an array of data, such as the image data 158, and a second subset that are used to acquire information that is used to determine the pose data. For example, the first subset may comprise one or more of the camera 136, a LIDAR sensor, a depth camera sensor, a stereocamera sensor, and so forth. Continuing the example, the second subset may comprise one or more of the IMU 138, a tilt sensor, a compass, the positioning system, and so forth.

The input device 130 may include one or more output devices 148. The output devices 148 may include a display screen, speaker, and so forth. For example, a display screen may be used to present a graphical user interface. In some implementations sensors 134 and output devices 148 may be combined. For example, a touchscreen may comprise a touch sensor and a display screen.

The input device 130 includes one or more memories 150. The memory 150 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 150 provides storage of computer-readable instructions, data structures, program modules, and other data for the operation of the input device 130. These modules may be executed as foreground applications, background tasks, daemons, and so forth. Some functional modules are shown stored in the memory 150, although the same functionality may alternatively be implemented in hardware, firmware, or as a system on a chip (SoC).

In some implementations, data or modules may be distributed across one or more other devices such as servers, network attached storage devices, other computing devices, and so forth.

The memory 150 may store a user interface module 152. The user interface module 152 may be used to provide a user interface to a user. In one implementation, the user interface module 152 may present output using an output device 148 and accept input using one or more sensors 134. For example, the user interface module 152 may be used to present instructions to a user as to how to manipulate the input device 130 to obtain input data 156 for use in determining the combined data 188. The user interface module 152 may then present the combined data 188, or information based thereon.

The input device 130 may operate the sensors 134 to acquire input data 156. The input data 156 may comprise one or more of image data 158, IMU data 160, compass data 162, or other data. One or more of the IMU data 160, compass data 162, or other data may be used to determine pose data. The pose data is indicative of the camera pose with respect to one or more axes. For example, the pose data may be indicative of the camera pose with respect to three degrees of freedom (3DoF), specifying the orientation of a camera frustrum axis with respect to three mutually orthogonal axes. Continuing the example, the pose data may comprise one or more of the azimuth, elevation, or rotation.

An instance of input data 156 may comprise image data 158, IMU data 160, and compass data 162 that are associated with a particular time or particular time window. In some implementations the input data 156 may comprise location data, such as geographic coordinates provided by a positioning system, such as a GNSS. In some implementations, input data 156 may be associated with timestamps obtained from a clock (not shown).

The memory 150 may store an augmented reality (AR) module 166. The AR module 166 provides various functionality associated with utilizing AR in which computer-generated information is associated with a physical space. For example, an AR module 166 may be used to overlay computer-generated objects onto an image acquired by the camera 136, such that the orientation, size, and placement of the objects appear to be consistent with the physical space. Continuing the example, the object may be a representation of a statue, and as the user moves the input device 130 around the apparent location of the statue, the apparent image on the display screen changes accordingly.

In one implementation, the AR module 166 may comprise the "ARCore" software and associated application programming interfaces (APIs) promulgated by Google, LLC and available on devices utilizing the Android operating system. In another implementation the AR module 166 may comprise the "ARKit" software and associated APIs promulgated by Apple, Inc. and available on devices running operating systems including iOS, iPadOS, VisionOS, and so forth. During operation, the AR module 166 may use data acquired from one or more of the sensors 134. For example, the AR module 166 may use one or more of the IMU data 160, the compass data 162, position data from a positioning system, and so forth.

The AR module 166 may be capable of operating in different tracking configurations that utilize different degrees-of-freedom (DoF) during operation. For example, a 3DoF configuration may provide camera pose information indicative of rotation with respect to three mutually orthogonal reference axes, and the location in space of the camera may be assumed to be constant. In comparison, a 6DoF configuration may provide camera pose information indicative of rotation and translation with respect to the three mutually orthogonal reference axes. In some implementations, use of the 3DoF configuration may be preferred. For example, the ARKit may be operated in the 3DoF configuration. In another example, the ARCore may be operated in a 3DoF configuration.

A virtual field-of-view (VFOV) 168 may be specified by VFOV data 170. The VFOV 168 may comprise one or more surfaces or geometric constructs that represent at least a portion of a physical space. For example, the VFOV 168 may represent at least a portion of the sky proximate to a location of the input device 130 during operation. In the example depicted, the VFOV 168 comprises a flat horizontal plane that is positioned at a height "h" above the proposed location of a UT 108, where the input device 130 is being used to acquire information about sky obstructions.

The VFOV data 170 may specify the size, shape, relative position, and other information about the VFOV 168. For example, the VFOV data 170 may also specify one or more parameters such as the height and radius of the flat horizontal plane, parameters used to generate AR markers 174 that are associated with the VFOV 168, and so forth. In some implementations the VFOV data 170 may be specified in advance. For example, the VFOV data 170 may comprise default or predefined parameters that are used during subsequent operation.

In other implementations, the VFOV data 170 may be based at least in part on other information. For example, position data from a positioning system or altitude data from a barometric altimeter sensor may be used to determine the height and radius, such that as altitude increases the radius increases. In another example, position data may be used to select a VFOV 168 geometry from a selection of geometries. Continuing this example, if the position data indicates that the position of the input device 130 is within a city a first VFOV 168 having a first size and shape may be used, in comparison if the position of the input device 130 is located in an unpopulated area, a second VFOV 168 having a second size and shape may be used. In yet another implementation, user input may be used to select a particular VFOV 168 associated with VFOV data 170 for subsequent use.

The VFOV data 170 may be provided as input to the AR module 166. Based on the VFOV data 170, the AR module 166 may generate a set of AR marker data 172 comprising a plurality of AR markers 174. Each AR marker 174 is associated with a particular set of coordinates and a unique identifier. The AR marker 174 may use coordinates that specify a location with respect to the physical space. For example, the coordinates of the AR marker 174 may specify a position as coordinates along three mutually orthogonal axes relative to an origin, such as (x,y,z). In one implementation the origin of these coordinates may be specified locally, such as the position of the input device 130 being arbitrarily assigned as being at coordinates (0,0,0). In another implementation, the coordinates may be specified to a geographic datum and their coordinates may be specified as (latitude, longitude, altitude).

The AR markers 174 may be distributed across a surface of the VFOV 168 as specified in the VFOV data 170. For example, the AR markers 174 may be distributed across the surface of the horizontal flat plane of the VFOV 168 depicted in FIG. 1, such that their (x,y) coordinates differ, but the height is constant. The AR markers 174 may be distributed randomly, at regular intervals or stride, and so forth.

During operation, the AR module 166 accepts as input the VFOV data 170 as described above and generates the AR marker data 172 comprising the AR markers 174. The AR module 166 accepts input data 156 acquired from the sensors 134. The input data 156 may comprise an array of data such as the image data 158, output from a LIDAR, output from a depth camera, and so forth. The input data 156 also comprises additional information, such as one or more of IMU data 160 or compass data 162. The AR module 166 uses this additional information to determine a pose of the sensor(s) 134 at the time the image data 158 was acquired. The pose may be indicative of the location and orientation of the sensor 134. The location and the orientation may be specified with respect to the same axes and coordinate system used with regard to the VFOV 168 and the AR marker data 172.

The AR module 166 processes this input to determine the portion and placement of the AR markers 174 relative to the image data 158. For example, the AR module 166 may determine, based on the pose and the VFOV 168, the relative placement with respect to the image data 158 of the AR markers 174 that are within the image data 158. During typical operation of the AR module 166, this may be used to overlay imagery of a computer-generated (or "virtual") object onto the image data 158, such that the virtual object appears to be in a particular location and pose with respect to the physical space, even while the camera 136 moves. As described in this disclosure, instead of or in addition to placing a virtual object into the image data 158, the AR markers 174 may be used to determine a relationship between image data 158 and the VFOV 168, allowing a mapping or projection of the image data 158 onto the VFOV 168.

As shown in the example of FIG. 1, the AR module 166 has used the image data 158 and VFOV data 170 as input and has overlaid the AR marker data 172 comprising a plurality of AR markers 174. This set of AR marker data 172 that is associated with the image data 158 may be subsequently associated with other data that is based on the image data 158.

One or more image processing modules 176 may accept image data 158 as input and provide as output processed data 178. In one implementation, the image processing modules 176 may comprise a previously trained semantic segmentation machine-learning (ML) model that determines a class for pixels in the image data 158. For example, the semantic segmentation model may determine if a pixel is in a "sky" class or an "obstruction" class. The output may comprise the image data 158 that has been annotated, or a generated image such as a binary image that distinguishes the two classes. For example, each pixel assigned to the "sky" class is set to a binary value of "0" while each pixel assigned to the "obstruction" class is set to a binary value of "1". The resulting processed data 178 may comprise a binary image having the same dimensions (rows and columns) as the image data 158. In another implementation, the image processing module(s) 176 may perform other functions such as color correction, lens distortion correction, chroma keying, image sharpening, edge detection, and so forth.

A transform module 180 determines relationship data 182 indicative of a relationship between the image data 158, or data based thereon such as the processed data 178, and the VFOV 168. This relationship may provide a mapping or projection of elements of the image data 158 (or the processed data 178) onto one or more of the virtual surfaces of the VFOV 168. The relationship may be determined using the AR markers 174 that are associated with the image data 158 (or the processed data 178) and the AR markers 174 in the VFOV 168 that have the same unique identifier.

In one implementation, the relationship data 182 may comprise a homography matrix. The homography matrix is representative of a geometric relationship between the image data 158 (or the processed data 178) and the corresponding portion of the VFOV 168 including rotation, translations, and distortions. In one implementation the homography matrix may be determined using the "findHomography" function of OpenCV as promulgated at Opencv.org. Instead of using features that have been extracted from the image data 158, the homography matrix is based on the AR markers 174. This technique may be used when the VFOV 168 comprises a flat plane.

In other implementations, different geometries of VFOV 168 and other techniques may be used. In one implementation, the VFOV 168 may comprise a hemisphere. In another implementation the VFOV 168 may comprise a plurality of flat planes, such as a flat horizontal plane overhead, and a set of vertical planes that intersect the flat horizontal plane. In still another implementation, the VFOV 168 may comprise a cylinder, forming a curved two-dimensional plane. In these implementations, other techniques may be used to determine a geometrical or other projection of the image data 158 (or processed data 178) and associated AR markers 174 onto the VFOV 168.

The image data 158, the processed data 178, or both, may be processed by the transform module 180 to determine transformed data 184. For example, the image data 158 (or the processed data 178) may be processed using the homography matrix specified in the relationship data 182 to determine the transformed data 184. For example, the transformed data 184 may be visualized as a "warped" version of the image data 158 that now corresponds to the corresponding portion of the VFOV 168 that includes the same AR markers 174.

An alignment module 186 may accept as input the transformed data 184 and determines combined data 188. For example, the alignment module 186 may align the transformed data 184 with the corresponding portion of the VFOV 168 and transfer the data of respective elements, such as individual pixels, to a representation of the VFOV 168. In some circumstances transformed data 184 may overlap, providing information about the same set of points within the VFOV 168. This overlapping data may be handled using one or more techniques. In a first technique the latest data acquired may be used, and earlier data discarded. In a second technique the overlapping data associated with the same point may be averaged or otherwise combined to determine a value that is used for an overlapping point. Given the use of the AR markers 174 to determine the relationship data 182, the transformed data 184 may be aligned directly to the VFOV 168 without further rotation, translation, or distortion.

In some implementations the functionality of the transform module 180 and the alignment module 186 may be combined. For example, the transform module 180 may determine the relationship data 182 and then perform a projection of the image data 158 (or the processed data 178) onto the VFOV 168.

In some implementations individual instances of transformed data 184 may be aligned relative to one another using other techniques. For example, one or more features present in the transformed data 184 may be detected and used to provide for further alignment, transform, or blending to provide a seamless transition between instances of the transformed data 184.

The combined data 188 provided by the alignment module 186 may be visualized as an array of elements that represent the VFOV 168. For example, the combined data 188 may comprise a contiguous representation of the VFOV 168. The combined data 188 may be subsequently used by other modules.

In this illustration, the combined data 188 is based on processed data 178 comprising semantic segmentation data. Depicted is a sky class 190 comprising pixels that have been classified as being associated with the "sky" class and an obstruction class 192 comprising pixels that have been classified as being associated with the "obstruction" class.

As mentioned above, in some implementations the alignment module 186 may accept as input the processed data 178 and determine combined data 188 based on that output. Performing the image processing using the one or more image processing module(s) 176 before processing by the alignment module 186, may reduce or eliminate artifacts in the resulting combined data 188 that may occur at the seams between instances of processed data 178.

The alignment module 186 may also provide other functions, such as aligning the VFOV 168 with an external frame of reference, such as true north, magnetic north, and so forth. For example, the alignment module 186 may use the compass data 162 and position data to determine a correction value between magnetic north and true north, and align the VFOV 168 to the true north.

In some implementations the alignment module 186 may provide information to other modules, such as the user interface module 152, indicating which portions of the VFOV 168 have been observed or not observed. For example, the alignment module 186 may provide information that, when presented on a display device by the user interface module 152, notifies the user as to which portions of the sky have not yet had input data 156 acquired. Continuing this example, this feedback provides the user with directions to direct the input device 130 such that sufficient input data 156 is acquired to provide information about the entire VFOV 168.

In some implementations, the combined data 188 may be processed using the one or more image processing modules 176. For example, the combined data 188 of image data 158 may be processed using the semantic segmentation module to determine semantic segmentation data.

The combined data 188 may also be used by other modules. For example, an analysis module (not shown) may use data such as orbital elements that represent the orbits of the satellites 102 in the constellation to determine the estimated location of satellites during usage at one or more times of day. This information may then be compared with the pixels associated with the obstruction class 192 to determine how those obstructions may affect communication with the constellation.

By using the techniques described, combined data 188 may be quickly and accurately determined, even in situations in which the image data 158 itself contains few or no distinguishing features. For example, while acquiring image data 158 of a featureless blue sky or an overcast gray sky, combined data 188 is still able to be generated. Errors that would otherwise result from only image-based features being used to "stitch" or join images are avoided, as are artifacts that may result from such operations. This improves the operation of other systems that ingest or otherwise use the combined data 188.

Figure 2A:
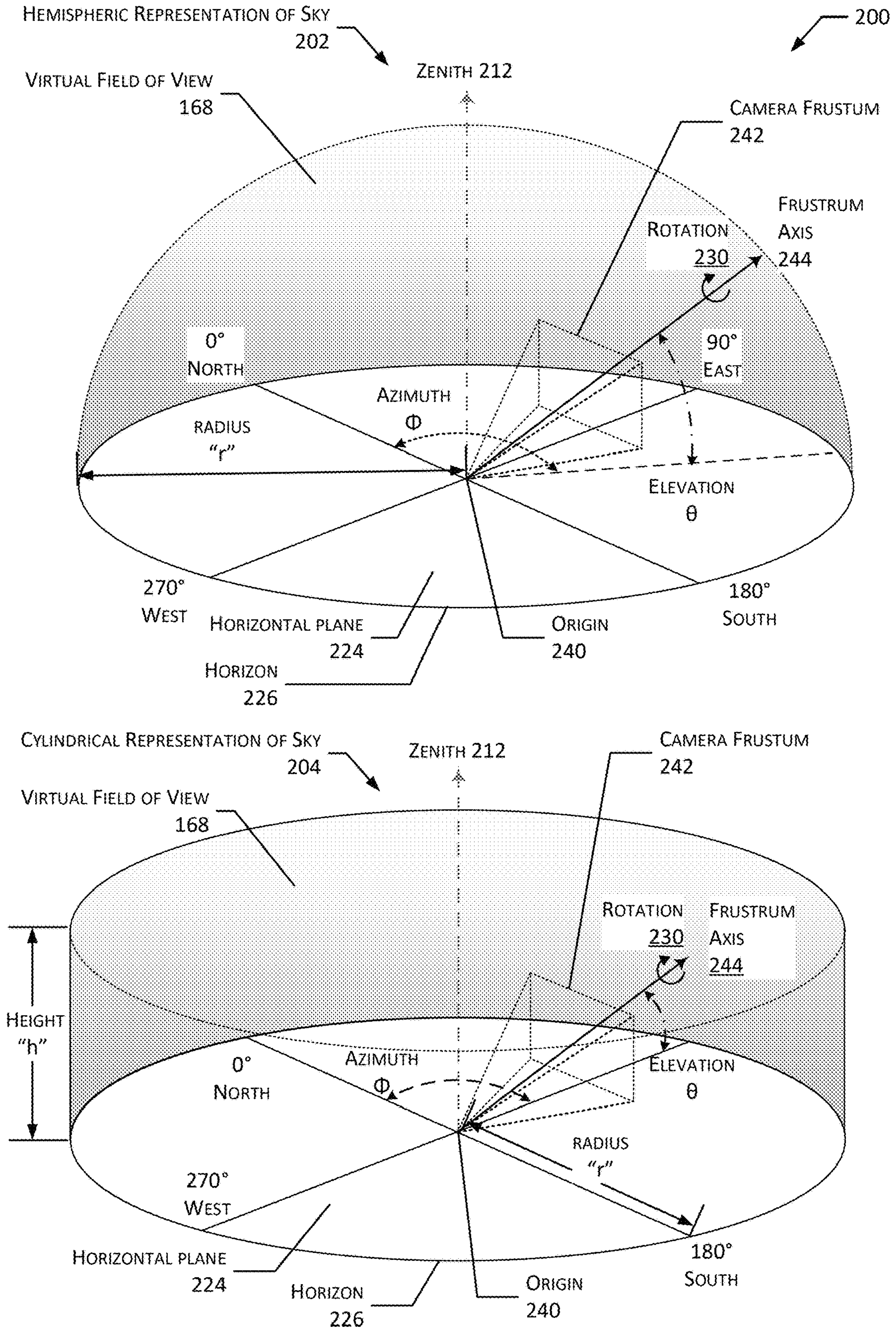
FIGS. 2A-2B depict several virtual fields of view (VFOV), according to some implementations.
Figure 2B:
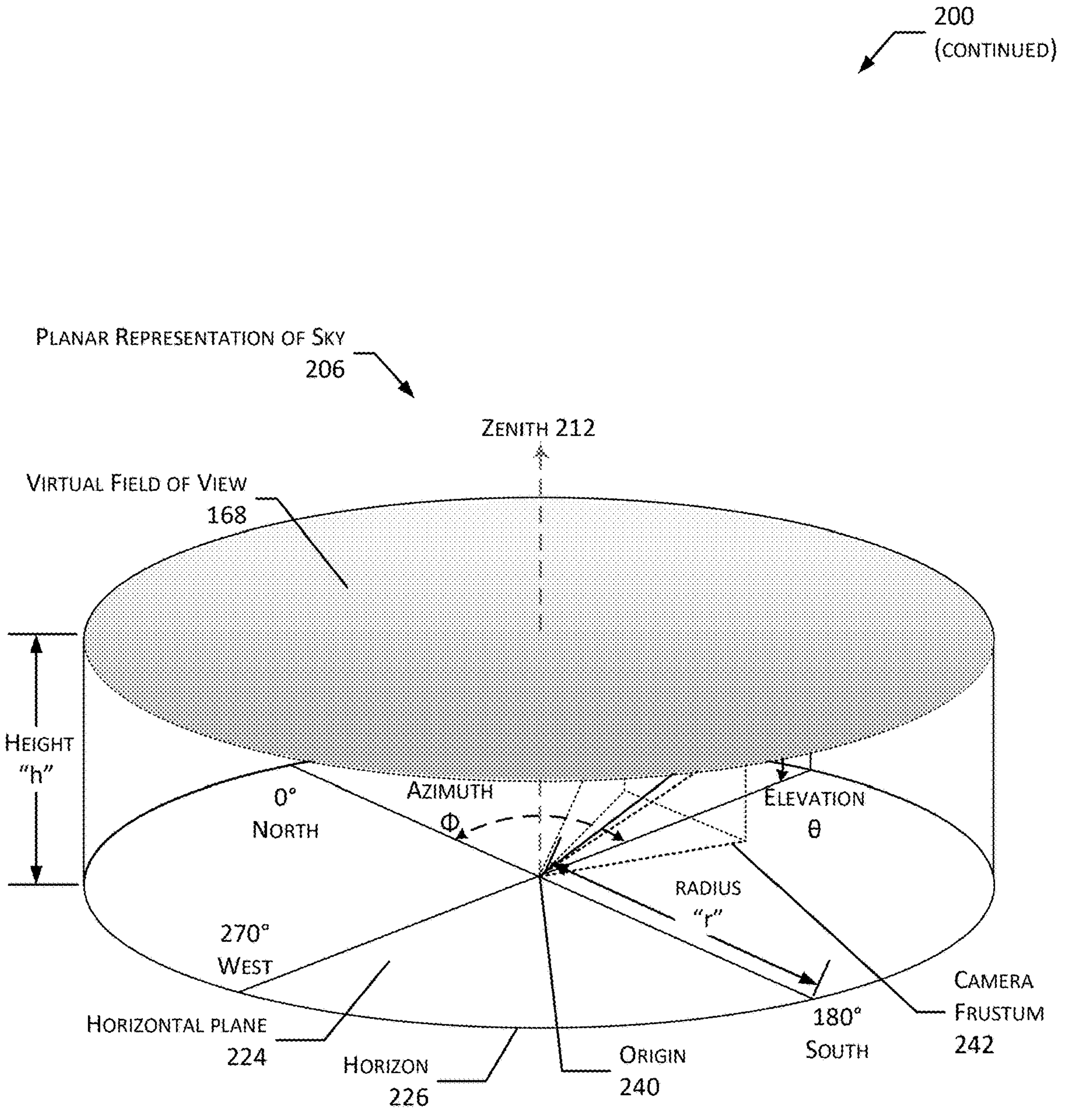

FIGS. 2A-2B depict at 200 several virtual fields of view (VFOV) 168, according to some implementations.

At 202 a hemispheric representation of sky is shown, in which the VFOV 168 comprises a hemispherical surface. A zenith 212 is depicted as a vertical line extending upward from an origin 240 such as the location of the input device 130 at the proposed location of the UT 108. Also shown is a horizontal plane 224, with the horizon 226 at the intersection between the horizontal plane 224 and the hemisphere describing the sky. The zenith 212 is normal to the horizontal plane 224.

The hemispherical surface may be defined by the radius "r" extending from the origin 240 to a perimeter of the hemisphere in the horizontal plane 224.

The direction from the origin 240 to objects in the physical space, such as the satellites 102 of the constellation, may be specified in terms of azimuth (phi or "@") and elevation (theta or "0"). Azimuth specifies an angle between a specified reference direction in the horizontal plane 224, such as true North, and the direction within the horizontal plane 224. Elevation specifies an angle, in a vertical plane perpendicular to the horizontal plane 224 and passing through the origin 240 and the object, between the horizontal plane 224 and the direction.

A camera frustrum 242 is shown, depicting the field-of-view of the camera 136 or other sensor 134 that acquires information from a scene. In this illustration, the camera frustrum 242 is centered along a frustrum axis 244. A direction of the frustrum axis 244 may also be described in terms of azimuth and elevation.

A rotation 230 specifies a rotation, with respect to the frustrum axis 244, of the camera frustrum 242. The rotation 230 may be specified with regard to one or more of the horizontal plane 224, the zenith 212, local vertical, and so forth.

At 204 a cylindrical representation of sky is shown, in which the VFOV 168 comprises a cylindrical curved surface. For example, the cylindrical representation may be used to acquire a panoramic image around the origin 240.

The cylindrical representation of sky 204 may be defined as a cylinder having radius "r" and height "h".

At 206 a planar representation of sky is shown. In this representation, the VFOV 168 comprises a flat horizontal plane 224 that is located above the origin 240 at height "h" and having a radius of "r".

In other implementations the VFOV 168 may use other geometric shapes, or combinations of geometric shapes.

Figure 3:
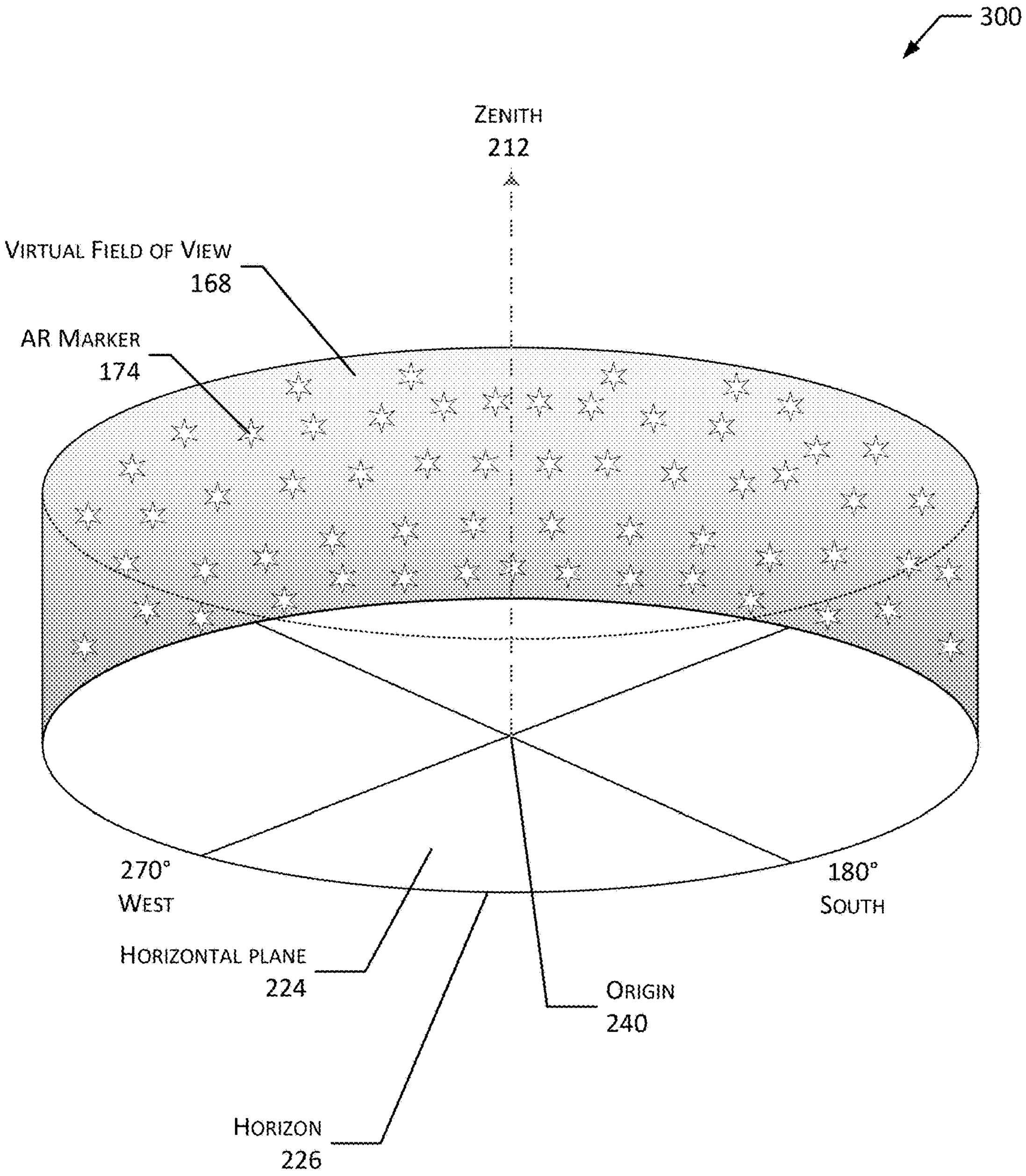
FIG. 3 depicts one implementation of a VFOV and associated augmented reality (AR) markers, according to some implementations.

FIG. 3 depicts at 300 one implementation of a VFOV 168, such as that shown at 204, and associated augmented reality (AR) markers 174, according to some implementations. As described above, based on the VFOV data 170, a plurality of AR markers 174 may be generated by, or for use by, the AR module 166.

Figure 4:
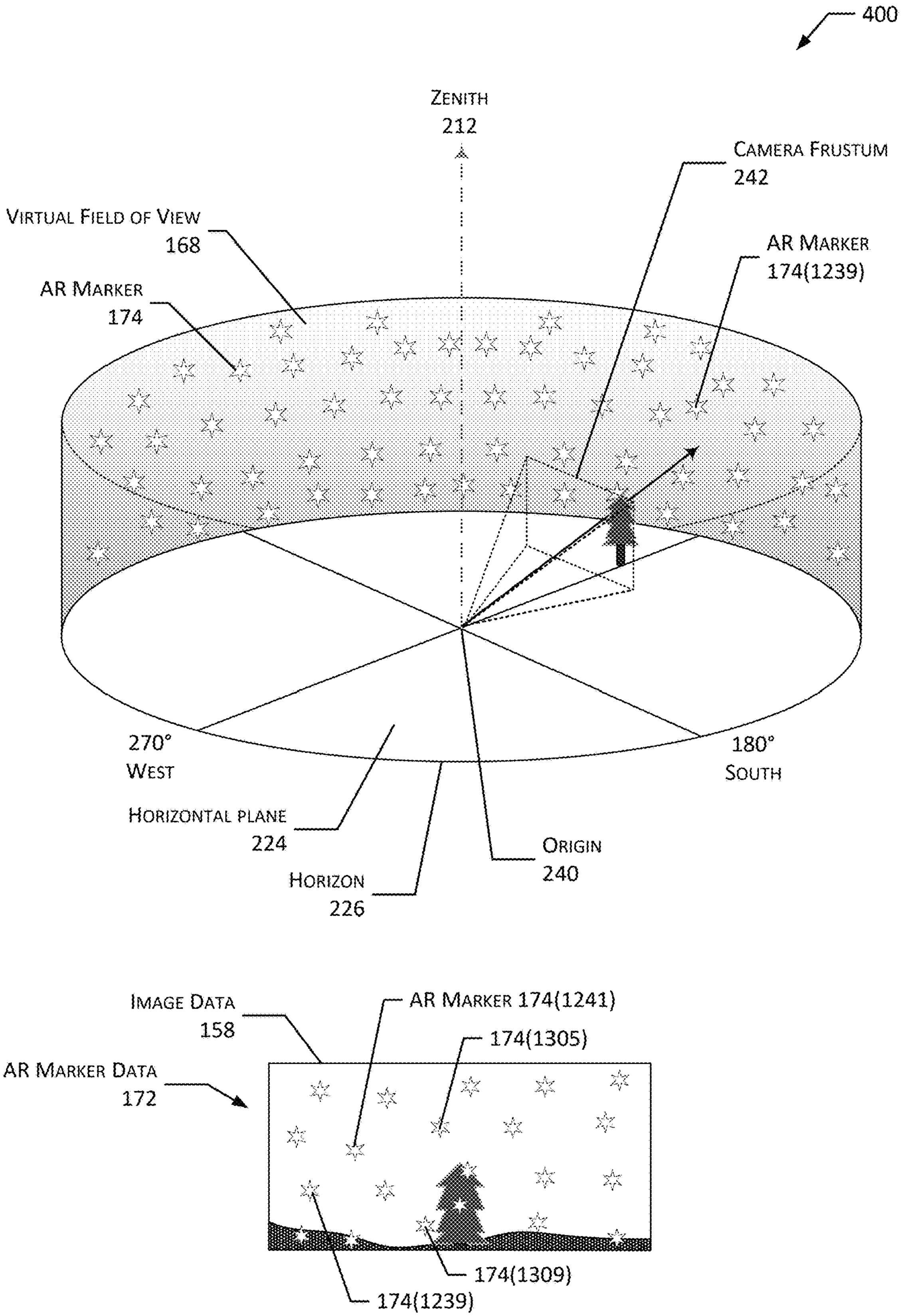
FIG. 4 depicts the VFOV of FIG. 3 and an associated camera frustrum, image data, and associated AR markers, according to some implementations.

FIG. 4 depicts at 400 the VFOV 168 of FIG. 3 and an associated camera frustrum 242, image data 158, and associated AR marker data 172, according to some implementations.

In this illustration, the camera 136 has acquired image data 158 that includes a portion of the scene that includes a tree. This resulting image data 158 is shown, with the associated AR marker data 172 overlaid. As described above, the AR module 166 is used to determine the portion of the AR markers 174 in the VFOV 168 that are present within the image data 158, and their relative position within the image data 158. For example, AR marker 174(1239) of the VFOV 168 is associated with the image data 158 at the coordinates relative to the image data 158 determined by the AR module 166.

Figure 5:
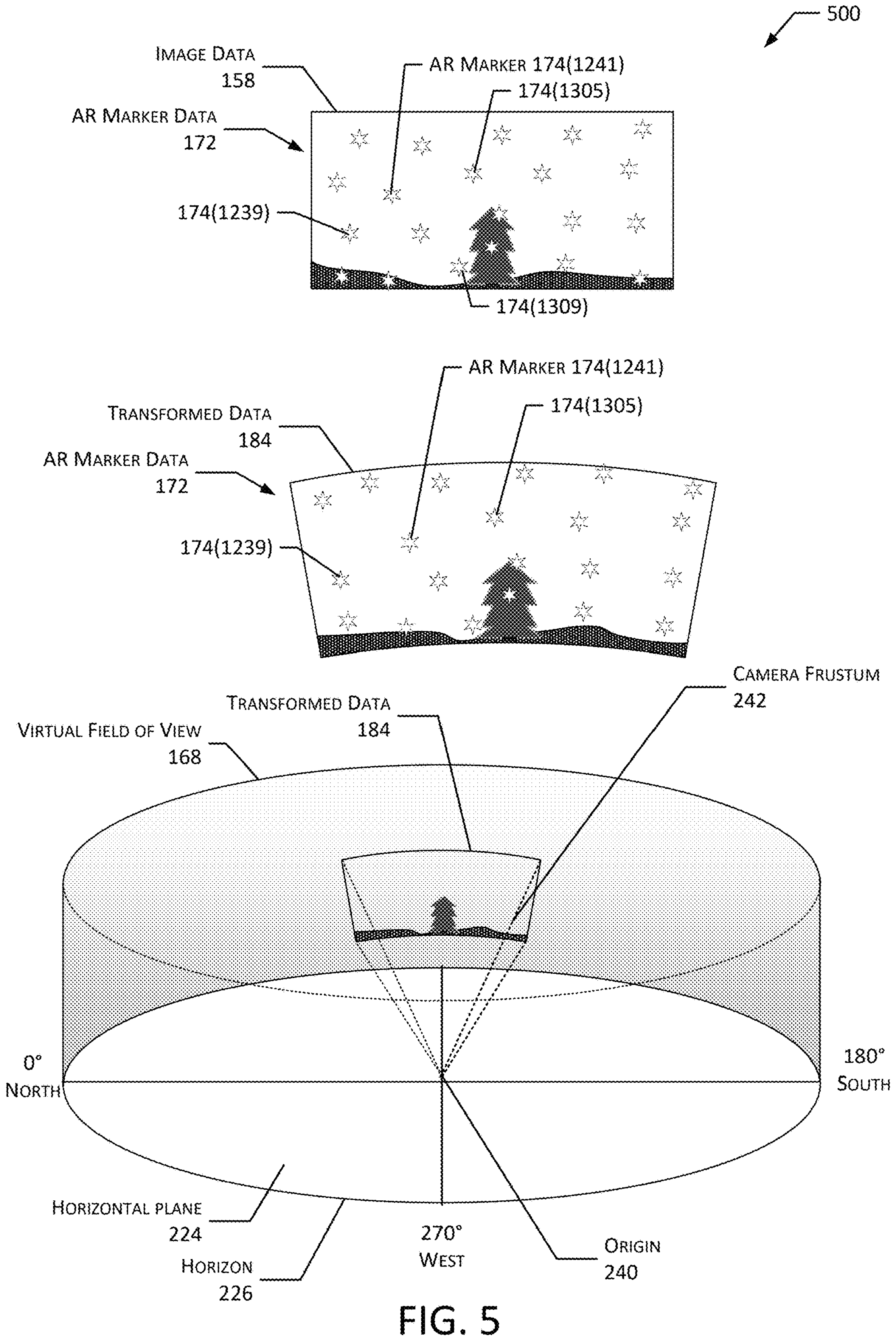
FIG. 5 depicts the image data, transformed data, and the alignment of the transformed data on the VFOV, according to some implementations.

FIG. 5 depicts at 500 the image data 158, corresponding transformed data 184, and the alignment of the transformed data 184 on the VFOV 168, according to some implementations.

The image data 158 is shown with associated AR marker data 172 comprising the plurality of AR markers 174 that the AR module 166 has determined are associated with the image data 158. Each of the AR markers 174 has an associated unique identifier.

As described, the transform module 180 uses the relative position of the AR markers 174 with respect to the image data 158 and their unique identifiers to determine the coordinates of the same AR marker 174 with respect to the VFOV 168. Based on this information, the transform module 180 determines the relationship data 182.

The transform module 180 may then use the relationship data 182 to transform the image data 158 into the transformed data 184. In this illustration, the transform comprises a warping or projection of the image data 158 onto the corresponding portion of the VFOV 168 that is associated with the same AR markers 174.

The transformed data 184 may then be aligned by the alignment module 186 to the VFOV 168. For example, the information in the transformed data 184 is added to the representation of the VFOV 168.

Figure 6:
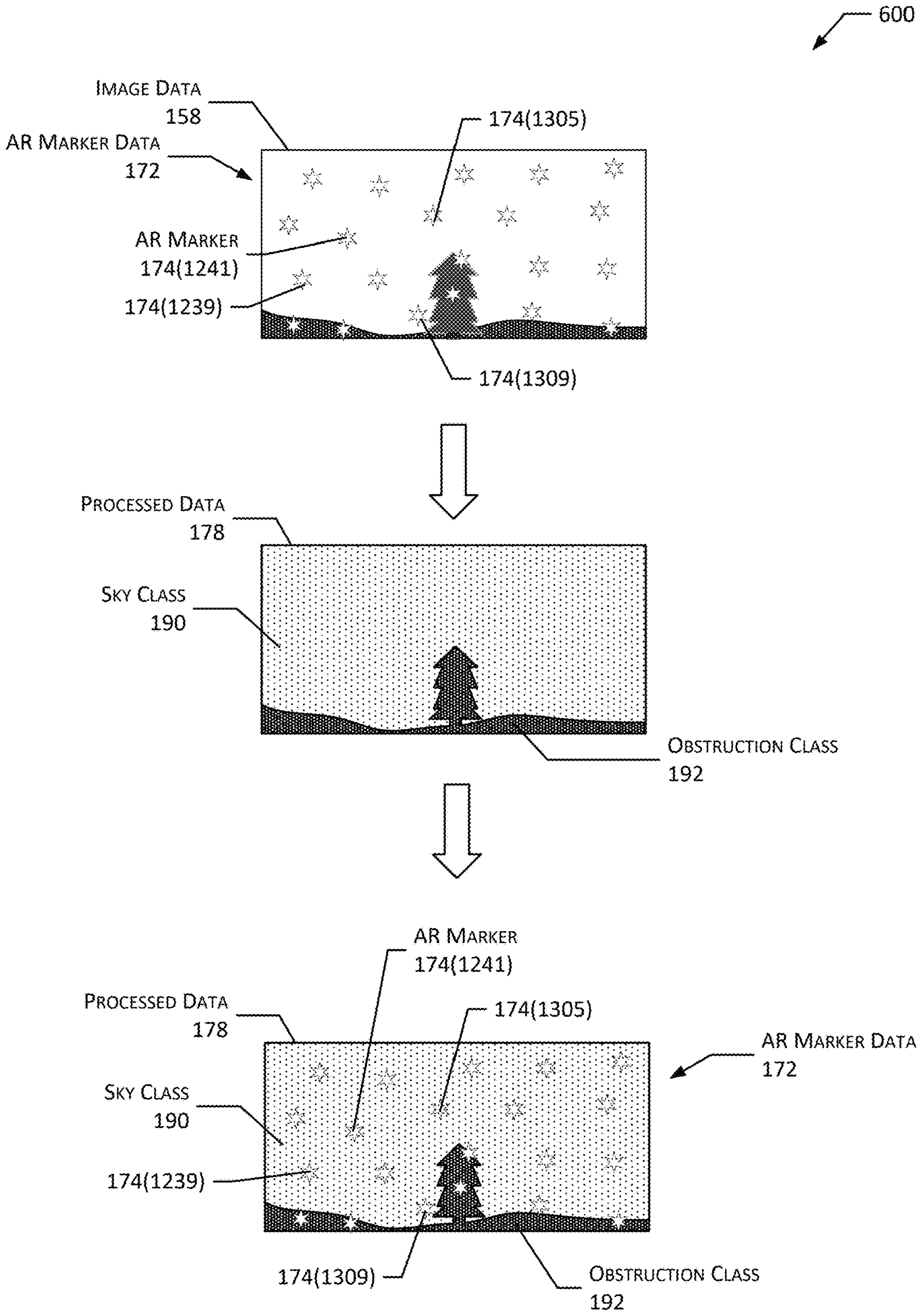
FIG. 6 depicts image data, processed data such as segmentation data, and associated AR markers, according to some implementations.

FIG. 6 depicts at 600 image data 158, processed data 178 such as segmentation data, and associated AR markers 174, according to some implementations. As described above, in some implementations image data 158 may be processed before being transformed or projected onto the VFOV 168. Performing the processing before transformation may reduce or eliminate artifacts in the resulting combined data 188.

The image data 158 is depicted with the associated AR marker data 172 comprising the AR markers 174 that are determined by the AR module 166 to be within the image data 158.

The image data 158 may be processed by one or more image processing modules 176 to determine processed data 178. In this illustration, the image processing module 176 comprises a semantic segmentation ML model that has been trained to classify pixels in the image data 158. For example, the semantic segmentation model may determine if a pixel is in a "sky" class 190 or an "obstruction" class 192. In this illustration, the processed data 178 depicts this classification of the pixels.

Also shown is the processed data 178 depicted with the associated AR marker data 172 comprising the AR markers 174 associated with the image data 158. For example, if the image data 158 and the processed data 178 have the same number of rows and columns of pixels, or dimensionality, the AR marker data 172 associated with the image data 158 may be associated with the processed data 178. In other implementations where the dimensionality between the image data 158 and the processed data 178 differs, a transform or other mapping may be used to relate the AR marker data 172 from the corresponding coordinates in the image data 158 to coordinates in the processed data 178.

Figure 7:
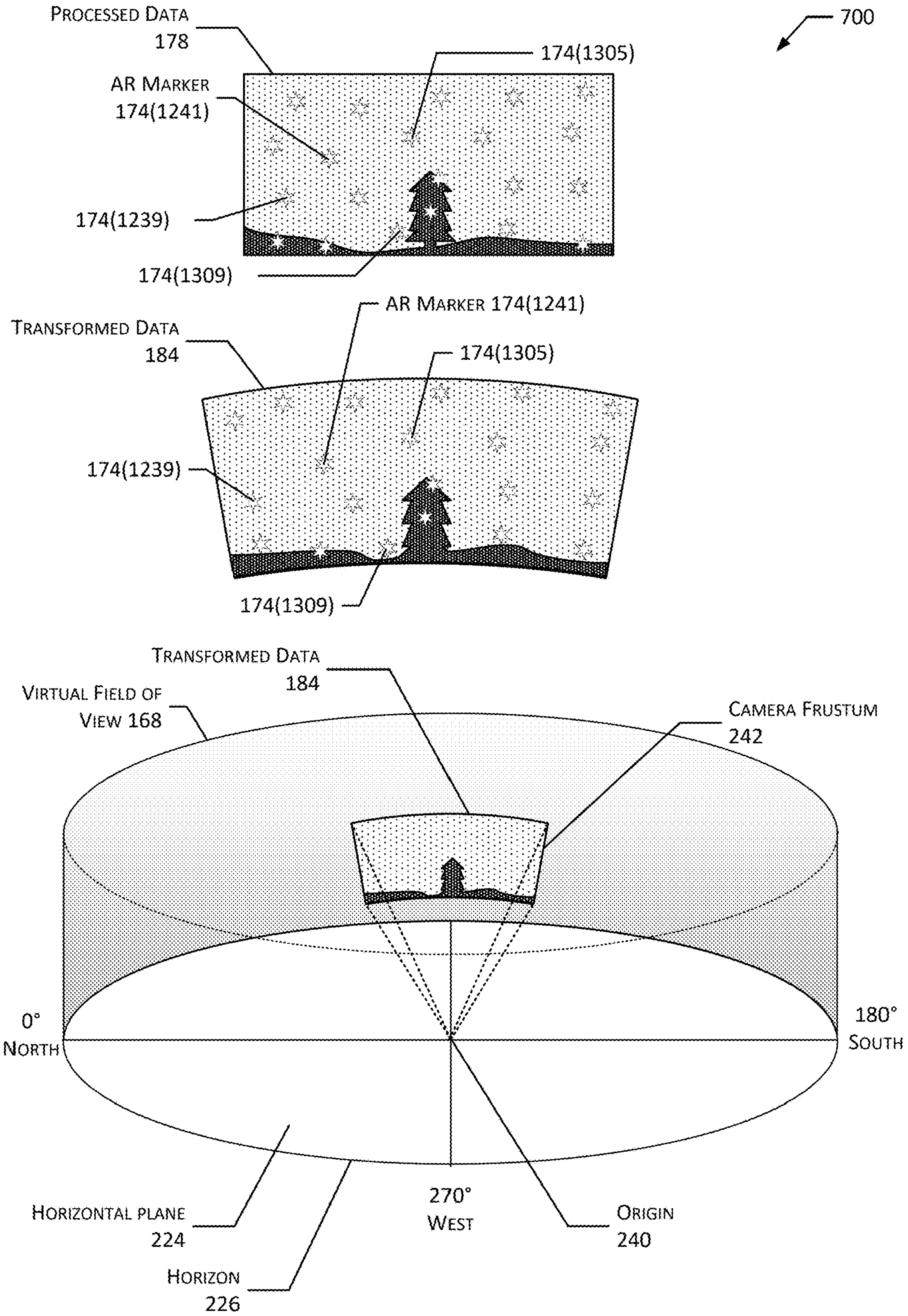
FIG. 7 depicts the processed data, transformed data, and the alignment of the transformed data on the VFOV, according to some implementations.

FIG. 7 depicts at 700 the processed data 178, the transformed data 184, and the alignment of the transformed data 184 on the VFOV 168, according to some implementations.

The processed data 178 is shown with associated AR marker data 172 comprising the plurality of AR markers 174 determined by the AR module 166. Each of the AR markers 174 has an associated unique identifier.

As described, the transform module 180 uses the relative position of the AR markers 174 with respect to the processed data 178 and their unique identifier to determine the coordinates of the same AR marker 174 with respect to the VFOV 168. Based on this information, the transform module 180 determines the relationship data 182.

The transform module 180 may then use the relationship data 182 to transform the processed data 178 into the transformed data 184. In this illustration, the transform comprises a warping or projection of the processed data 178 onto the corresponding portion of the VFOV 168 that is associated with the same AR markers 174.

The transformed data 184 may then be aligned by the alignment module 186 to the VFOV 168. For example, the information in the transformed data 184 is added to the representation of the VFOV 168.

Figure 8:
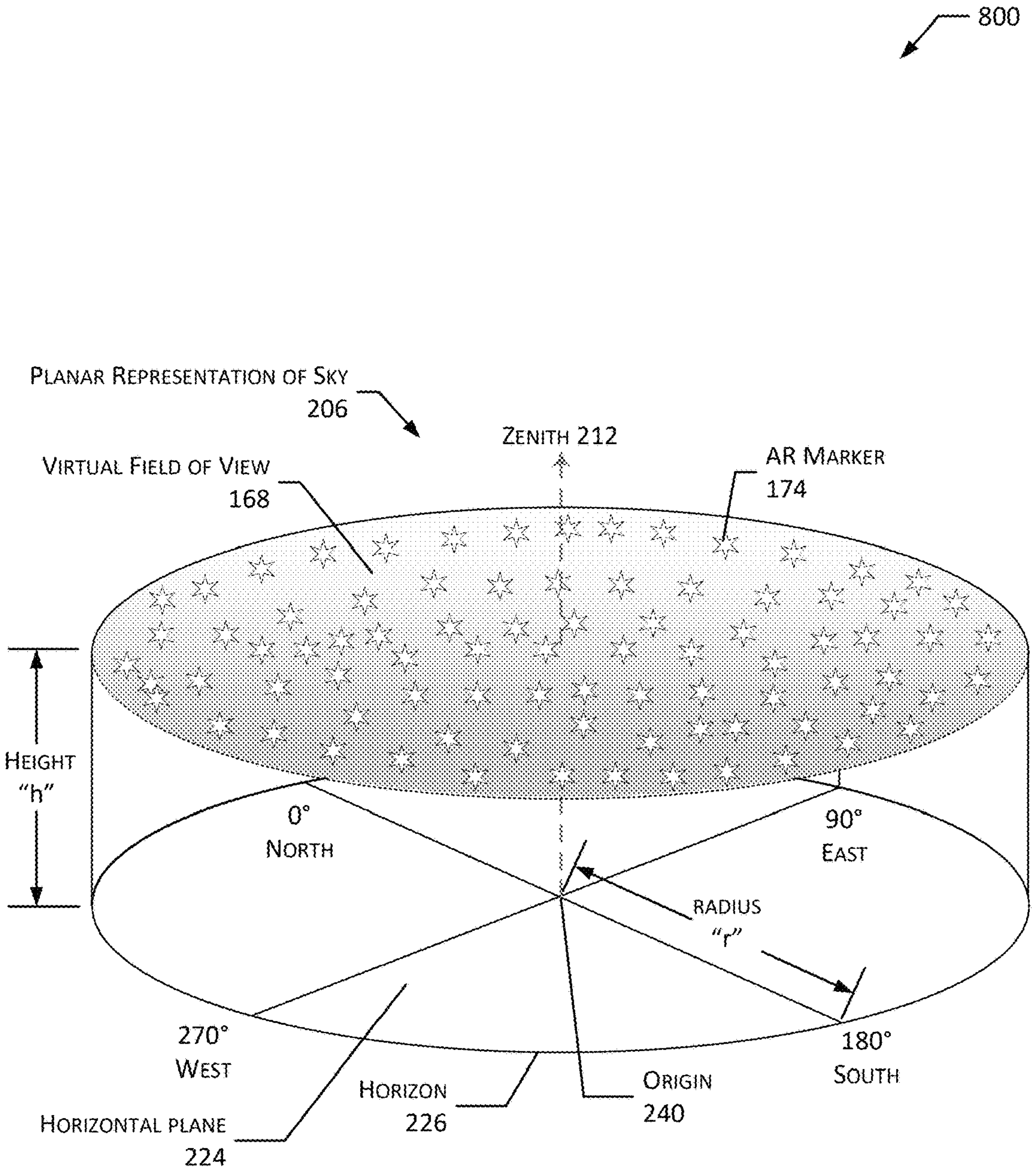
FIG. 8 depicts a flat planar VFOV and associated AR markers, according to some implementations.

FIG. 8 depicts at 800 the flat planar VFOV 168 and associated AR markers 174, according to some implementations. As described with regard to 206 in FIG. 2B, a planar representation of sky may be used in some implementations. This planar representation may comprise a flat horizontal plane that is located above the origin 240 at height "h" and having a radius of "r".

The height and radius may be selected to provide a representation of the sky that is suitable for use, such as to determine if obstructions are present that would impair communication with satellites 102 in the constellation during operation. For example, the height may be set at 5 meters above the origin 240 and the radius may be set at 20 meters.

As described above, based on the VFOV data 170, a plurality of AR markers 174 may be generated by, or for use by, the AR module 166. These AR markers 174 each are associated with a unique identifier and coordinates that specify their location in the VFOV 168. For example, the coordinates may be specified with respect to three mutually orthogonal axes such as (x,y,z). Continuing the example shown, the z value for each AR marker 174 in the VFOV 168 comprising the flat horizontal plane may be the same.

The use of the planar representation shown in FIG. 8 allows the techniques described in this disclosure to be readily performed on a device that has resource constraints. For example, the calculation of the relationship data 182 such as a homography matrix between the flat plane of the image data 158 and the flat plane of the VFOV 168 shown in FIG. 8 is computationally simple. As a result, the relationship data 182 may be quickly calculated providing a real-time or near-real-time experience to the user of the input device 130 by presenting information about the acquisition of input data 156 using the user interface module 152.

The relative density or arrangement of the AR markers 174 may be varied. In one implementation the AR markers 174 may be randomly placed within the VFOV 168, such as shown here. In another implementation the AR markers 174 may be arranged such that each instance of image data 158 that is acquired is likely to contain a specified minimum number of AR markers 174, such as four. For example, the area of the VFOV 168 proximate to the zenith 212 may contain a relatively high density of AR markers 174 per unit area of the plane of the VFOV 168, while a relatively sparse density of AR markers 174 may be used near the perimeter of the VFOV 168. This may be suitable as the area of the VFOV 168 encompassed by the camera frustrum 242 increases as the frustrum axis 244 is directed away from the zenith 212. Such a variable density of AR markers 174 may be used to minimize the number of computations performed by the processor(s) 132, further improving performance. For example, the density of AR markers 174 may be proportionate to a radial distance from the origin 240 or the center of the VFOV 168 located at the point where the zenith 212 intersects the plane of the VFOV 168.

Figure 9A:
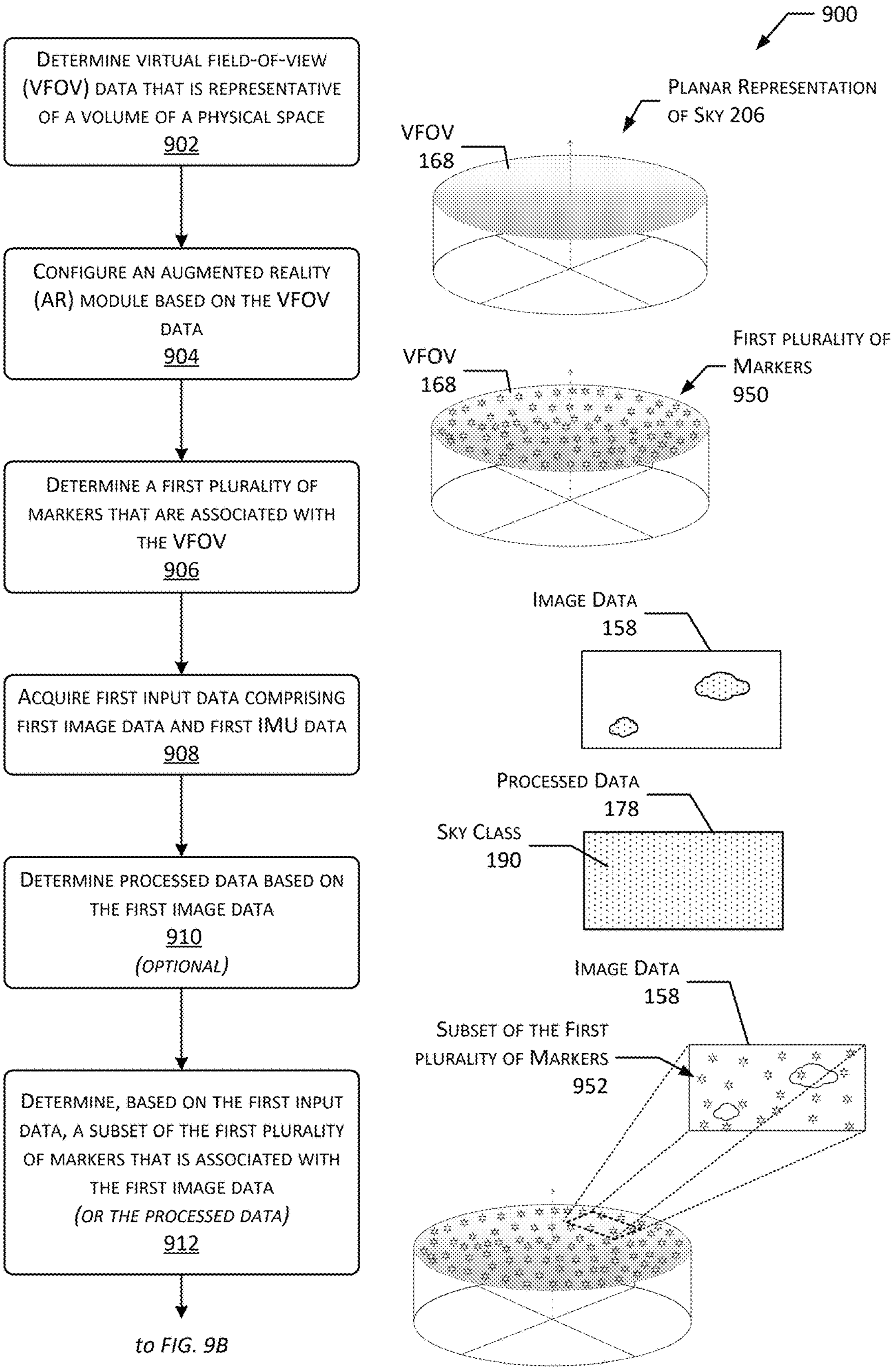
FIGS. 9A-9B depict a flow diagram of a process to determine combined data using AR markers, according to some implementations.
Figure 9B:
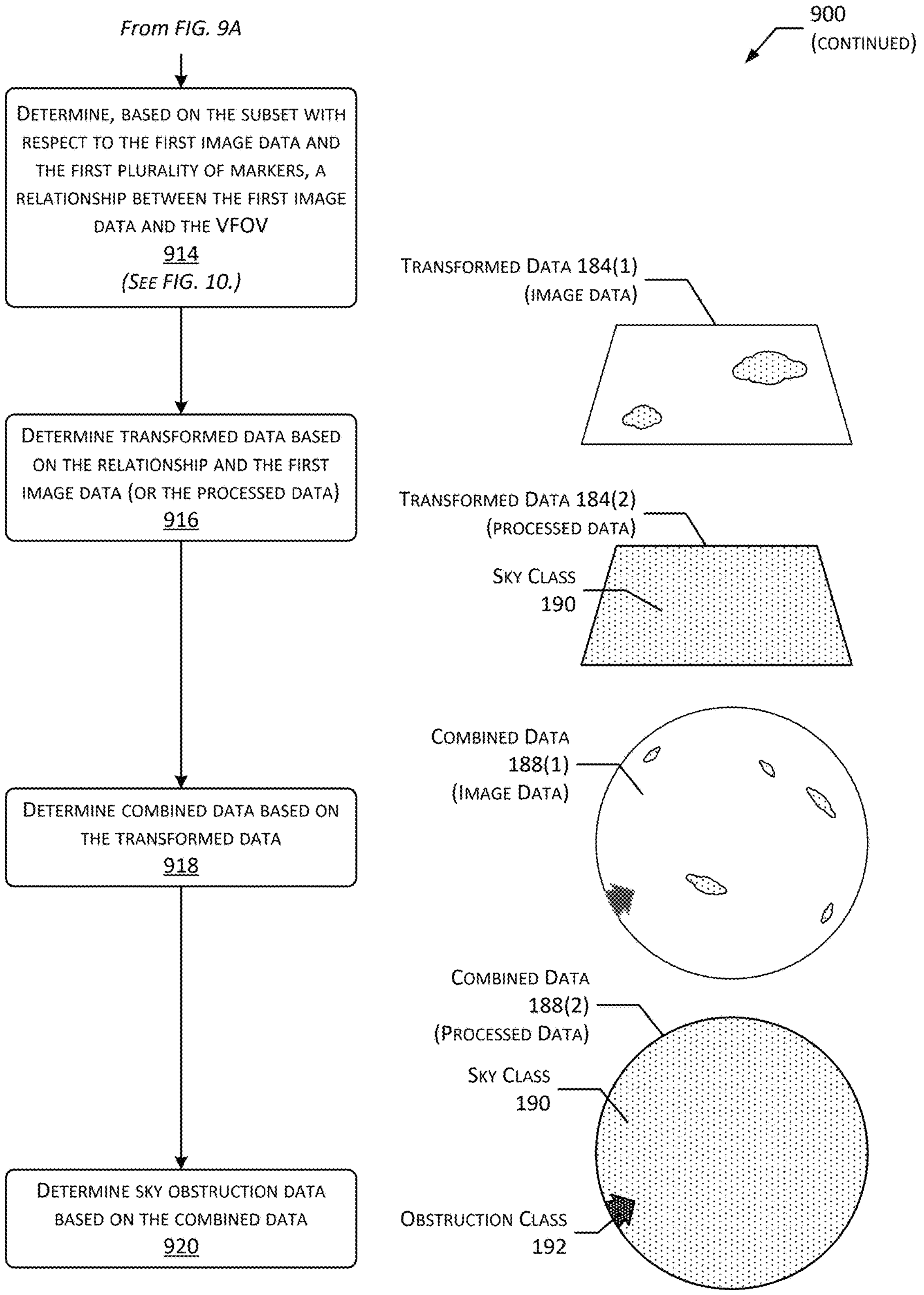

FIGS. 9A-9B depict at 900 a flow diagram of a process to determine combined data 188 using AR markers 174, according to some implementations. The process may be performed by one or more processors 132.

At 902 a VFOV 168 is determined that is representative of a portion of a physical space. The VFOV 168 may comprise a sphere, hemisphere, cylinder, plane, plurality of planes, cuboid, and so forth. The VFOV data 170 may comprise one or more parameters that define the VFOV 168. For example, the VFOV data 170 may specify a height and radius of a flat horizontal plane that is to be used as the VFOV 168.

At 904 the AR module 166 is configured based on the VFOV data 170. For example, the VFOV data 170 may be provided to the AR module 166.

At 906, using the AR module 166, AR marker data 172 is determined comprising a first plurality of AR markers 174 that are associated with the VFOV 168. Each AR marker 174 is associated with a point within or on the VFOV 168 and has a unique identifier. That point may be specified by a set of coordinates that represent the location of the point. For example, each AR marker 174 may be associated with a set of (x,y,z) coordinates. In this illustration, a first plurality of markers 950 associated with the VFOV 168 are depicted.

At 908 first input data 156 is acquired comprising first image data 158 and other data such as first IMU data 160, first compass data 162, and so forth. The first image data 158 comprises information about a scene, while the other data such as the IMU data 160 and the compass data 162 provide information about the pose of the camera 136 (or other sensor) during acquisition of the image data 158. In this illustration, the image data 158 depicts a few clouds.

At 910 first processed data 178 based on the first image data 158 may be determined. In some implementations the processed data 178 may be determined, and then transformed and used to determine the combined data 188. This may reduce or mitigate artifacts in the combined data 188. In one implementation, the first processed data 178 may be indicative of a set of classes for elements of the first image data 158. For example, each element of the processed data 178 may comprise a pixel, and each pixel may be classified using a semantic segmentation model to determine if that pixel is a sky class 190 or an obstruction class 192. In this illustration, the entirety of the processed data 178 indicates sky class 190, as the clouds visible in the image data 158 were properly classified as sky class 190.

At 912 based on the first input data 156, a first subset 952 of the first plurality of AR markers 174 that is associated with the first processed data 178 (or the first image data 158) is determined. For example, the AR module 166 may accept the first processed data 178 (or the first image data 158) as the input data 156 and determine as output the AR markers 174 associated with the first plurality of markers 950 that are within the processed image 178 (or the image data 158) and the relative position of those AR markers 174 with respect to the processed data 178 (or the image data 158).

At 914 based on the first subset with respect to the first processed data 178 (or the image data 158) and the first plurality of markers 950, a first relationship between the first processed data 178 (or the first image data 158) and the VFOV 168 is determined. For example, the transform module 180 may determine relationship data 182 such as a homography matrix that provides a projection from a relative coordinate with respect to the processed data 178 (or the image data 158) to a corresponding coordinate with respect to the VFOV 168. For example, the relationship data 182 may relate image coordinates of a pixel (row,column) to coordinates (x,y) on a flat plane or coordinates (x,y,z) on a non-planar surface of the VFOV 168. For example, the transform module 180 may perform this operation. This is discussed in more detail with regard to FIG. 10.

At 916 first transformed data 184 is determined based on the first relationship as expressed in the relationship data 182 and the first processed data 178 (or the image data 158). In one implementation, individual AR markers 174 of the first subset 952 of the first transformed data 184 are aligned to the AR markers 174 of the first plurality of markers 950 of the VFOV 168 having the same unique identifier. For example, the alignment module 186 may perform this operation. In this illustration, first transformed data 184(1) is depicted based on the image data 158, showing a pair of clouds. Also shown is second transformed data 184(2) based on the processed data 178.

The operations of 908-916 may be repeated to acquire other image data 158 and determine other transformed data 184.

At 918 combined data 188 is determined based on the first transformed data 184 and other transformed data 184 that has been determined. For example, the alignment module 186 may transfer data about individual elements such as pixels from the transformed data 184 to the VFOV 168. In this way, individual instances of image data 158 obtained in different poses may be combined to provide a seamless or contiguous representation of a portion of the physical space that is much larger than the field-of-view of the camera 136 or other sensor 134 used to acquire information about the scene.

In this illustration first combined data 188(1) is depicted based on the image data 158, showing clouds and the top of a tree. Also shown is second combined data 188(2) based on the processed data 178.

At 920 sky obstruction data, or other data, may be determined based on the combined data 188. For example, the combined data 188(2) may be assessed to determine if the obstruction class 192 obscures the expected locations of satellites 102 more than a specified amount. For example, the sky obstruction data may indicate a percentage of the sky as represented by the combined data 188(2) that is associated with the obstruction class 192. In another example, the sky obstruction data may be based on the calculated location of satellites 102 in the sky, and whether the portions of the obstruction class 192 that occlude or overlap those calculated locations exceeds a threshold value.

Figure 10:
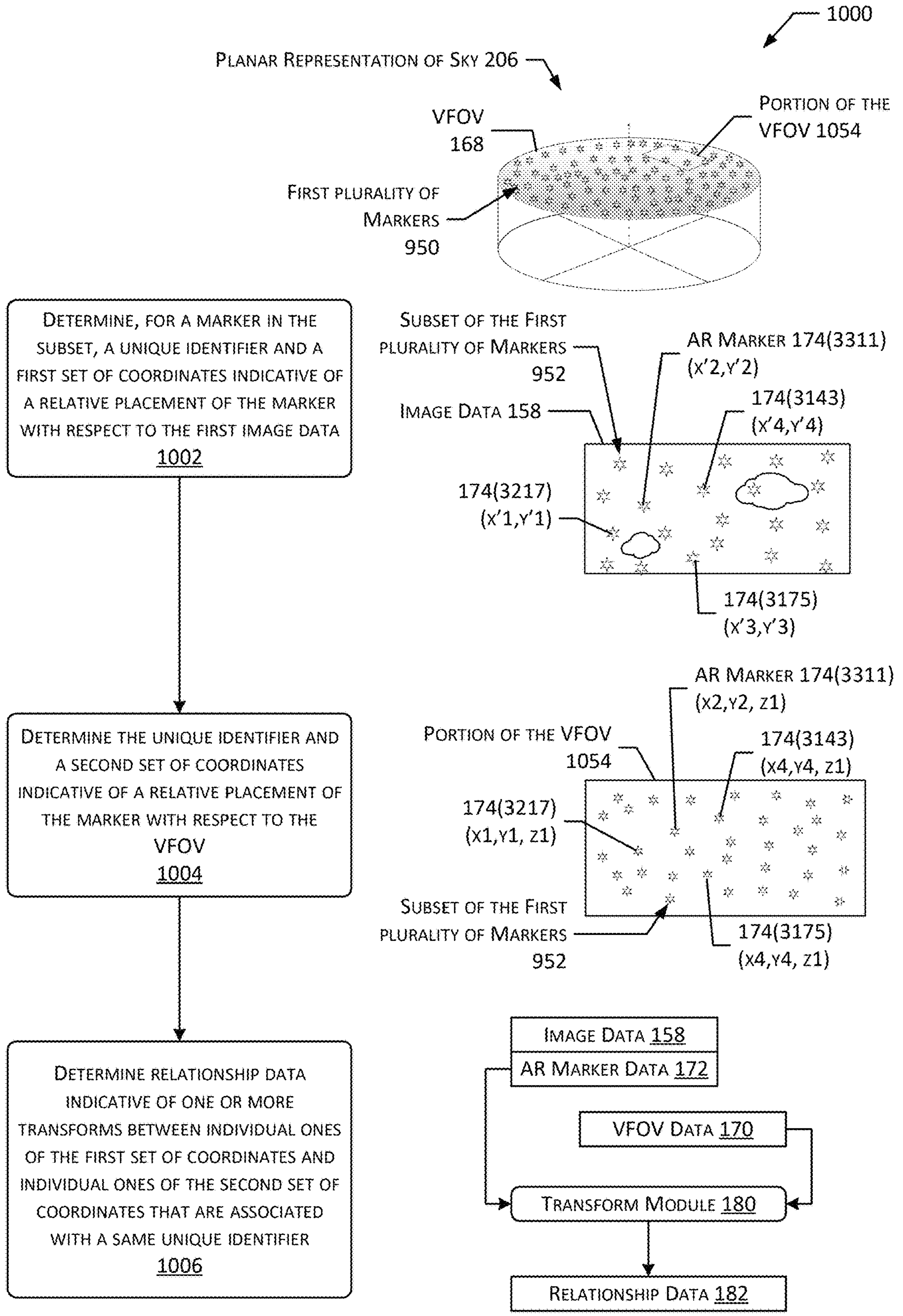
FIG. 10 depicts a flow diagram of a process to determine relationship data between image data and the VFOV, according to some implementations.

FIG. 10 depicts at 1000 a flow diagram of a process to determine relationship data 182 between image data 158 and the VFOV 168, according to some implementations. The process may be performed by one or more processors 132. FIG. 10 continues the description with respect to FIGS. 9A-9B.

At 1002 a unique identifier and a first set of coordinates (row, column) indicative of a relative placement of the AR marker 174 with respect to the first image data 158 is determined for an AR marker 174 in the first subset 952. For example, the AR module 166 may provide output data indicative of the unique identifier and coordinates (row, column) for each AR marker 174 determined to be associated with the image data 158.

Depicted in FIG. 10 is the VFOV 168 comprising the planar representation of sky 206, and a portion of the VFOV 1054. The portion of the VFOV 1054 depicts the intersection of the camera frustrum 242 and the VFOV planar representation of sky 206 at the time the image data 158 was acquired.

The image data 158 is also depicted, with the associated AR markers 174 shown.

At 1004 the unique identifier and a second set of coordinates (x,y,z) indicative of a relative placement of the AR marker 174 with respect to the VFOV 168 is determined. This information may be retrieved from the set of AR marker data 172 determined by, or for, the AR module 166 during configuration. In this illustration, an enlarged view of the portion of the VFOV 1054 is shown, including the AR markers 174.

At 1006 relationship data 182 may be determined that is indicative of one or more transforms between individual ones of the first set of coordinates and individual ones of the second set of coordinates that are associated with a same unique identifier. For example, given that the unique identifiers allow for a precise match between the AR markers 174 as associated with the image data 158 and the VFOV 168, a geometric relationship may be calculated that relates the coordinates of elements in that image data 158, such as expressed as (row,column) for each pixel to coordinates of a position in the VFOV 168 such as expressed as (x,y,z).

In one implementation the relationship data 182 may comprise a homography matrix that is determined using the "findHomography" function of OpenCV as promulgated at Opencv.org. This particular technique may be used when the VFOV 168 comprises a flat plane, such as the planar representation of sky 206. Instead of using features that have been extracted from the image data 158, the homography matrix utilizes the coordinates of the AR markers 174.

Operations involving the determination of discrete features in different images and attempting to relate them to determine the homography matrix are eliminated, as the unique identifiers associated with the AR markers 174 may be used instead. This may result in a reduction in the number of instructions executed by the processor 132, and reduce overall latency. This may also mitigate or eliminate artifacts that may result from techniques that use features in the images. For example, transformation errors may occur if two different features in different images are incorrectly deemed to be the same feature, or if the same feature in two images is incorrectly determined to be different. This may result in the manifestation of artifacts in the resulting "stitched" data.

The coordinate systems used may be those deemed convenient for calculation. For example, pixels within image data 158 may be specified as (row,column), while elements within an array of data may be specified by other indices such as (index_1, . . . , index_n) where n is a nonzero integer. In another example, positions within the VFOV 168 may be expressed as (x,y,z) coordinates, such as with respect to the origin 240 or a geographic datum. Continuing this example, given the planar representation of sky 206, the z coordinate, which is identical, may be omitted and coordinates with respect to the VFOV 168 may be expressed as (x,y) coordinates, or as polar coordinates indicating an azimuth and distance. In another example, the VFOV 168 may comprise a two-dimensional construct and the coordinates may be expressed as coordinates within that two-dimensional construct, such as (x,y).

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet. Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:

a camera that during operation acquires image data;

an inertial measurement unit (IMU) sensor that during operation acquires IMU data, wherein the IMU sensor and the camera are fixed relative to one another; and a first set of one or more processors executing instructions to:

determine a virtual field-of-view (VFOV) that is representative of a first portion of sky;

configure an augmented reality (AR) module based on the VFOV;

determine, using the AR module, a first plurality of markers that are associated with the VFOV, wherein each marker is associated with a point within the VFOV and a unique identifier;

acquire first input data comprising first image data indicative of a second portion of the sky and first IMU data associated with acquiring the first image data, wherein the second portion of the sky is a subset of the first portion of the sky;

determine first processed data based on the first image data, wherein the first processed data is indicative of a set of classes for elements of the first image data;

determine, based on the first input data, a first subset of the first plurality of markers that is associated with the first processed data;

determine, based on the first subset with respect to the first processed data and the first plurality of markers, a first relationship between the first image data and the VFOV, wherein the first relationship represents a projection of the first image data onto a corresponding portion of the VFOV that is associated with a same AR marker; and determine first transformed data based on the first relationship and the first processed data, wherein individual markers of the first subset that are associated with the first transformed data are aligned to the markers of the first plurality of markers of the VFOV having the same unique identifier.

2. The system of claim 1, further comprising instructions that when executed by the first set of one or more processors, cause the system to:

acquire second input data comprising second image data indicative of a third portion of the sky and second IMU data associated with acquiring the second input data, wherein the third portion of the sky is a subset of the first portion of the sky;

determine second processed data based on the second image data, wherein the second processed data is indicative of the set of classes for elements of the second image data;

determine, based on the second processed data, a second subset of the first plurality of markers that is associated with the second processed data;

determine, based on the second subset with respect to the second processed data and the first plurality of markers, a second relationship between the second processed data and the VFOV;

determine second transformed data based on the second relationship and the second processed data, wherein individual markers of the second subset that are associated with the second transformed data are aligned to the markers of the first plurality of markers of the VFOV having the same unique identifier; and determine combined data based on the first transformed data and the second transformed data.

3. The system of claim 1, wherein the set of classes comprise:

a first class that is associated with the sky, and a second class that is associated with an obstruction of the sky.

4. The system of claim 1, further comprising instructions that when executed by the first set of one or more processors, cause the system to:

determine a homography matrix that relates coordinates, with respect to the first processed data, of a plurality of markers in the first subset with coordinates, with respect to the VFOV, corresponding to markers having a same unique identifier; and wherein:

the VFOV comprises a horizontal flat plane, and the first relationship comprises the homography matrix.

5. A system comprising:

a first set of sensors that during operation acquire input data; and a first set of one or more processors executing instructions to:

determine a virtual field-of-view (VFOV) that is representative of a first portion of an exterior environment;

determine a first plurality of augmented reality (AR) markers, wherein each AR marker is associated with a point within the VFOV and a unique identifier;

acquire, using the first set of sensors, first input data comprising a first array of data indicative of a second portion of the exterior environment and first pose data that is indicative of a pose associated with acquisition of the first array of data, wherein the second portion of the exterior environment is a subset of the first portion of the exterior environment;

determine, based on the first input data, a first subset of the first plurality of AR markers that is associated with the first array of data; and determine a first relationship between the first array of data and the VFOV, based on the first subset with respect to the first input data and the first plurality of AR markers with respect to the VFOV, wherein the first relationship represents transforms between individual ones of a first set coordinates in the first array of data and individual ones of a second set of coordinates in the VFOV that are associated with a same unique identifier.

6. The system of claim 5, the first set of sensors comprising a first sensor subset used to acquire the first array of data and a second sensor subset, the first sensor subset comprising one or more of:

a camera, a LIDAR, a depth camera, or a stereocamera; and the second sensor subset comprising one or more of:

an inertial measurement unit (IMU), a tilt sensor, or a compass; and wherein the first set of sensors are mounted to a first device.

7. The system of claim 5, further comprising instructions that when executed by the first set of one or more processors, cause the system to:

determine first processed data based on the first array of data;

determine first transformed data based on the first relationship and the first processed data, wherein the first transformed data is aligned to the VFOV;

acquire second input data comprising a second array of data indicative of a third portion of the exterior environment and second pose data associated with acquiring the second array of data, wherein the third portion of the exterior environment is a subset of the first portion of the exterior environment;

determine second processed data based on the second array of data;

determine, based on the second processed data, a second subset of the first plurality of AR markers that is associated with the second processed data;

determine, based on the second subset with respect to the second processed data and the first plurality of AR markers, a second relationship between the second processed data and the VFOV;

determine second transformed data based on the second relationship and the second processed data, wherein individual AR markers of the second subset that are associated with the second transformed data are aligned to the AR markers of the first plurality of AR markers of the VFOV having the same unique identifier; and determine combined data based on the first transformed data and the second transformed data.

8. The system of claim 5, wherein the first set of sensors comprises a camera; and further comprising instructions that when executed by the first set of one or more processors, cause the system to;

operate the camera to acquire the first array of data, wherein the first array of data comprises an image; and determine first transformed data based on the first relationship and the first array of data, wherein the first transformed data is aligned to the VFOV.

9. The system of claim 5, wherein the first pose data is indicative of an azimuth, an elevation, and a rotation of a first sensor of the first set of sensors when the first array of data is acquired.

10. The system of claim 5, further comprising instructions that when executed by the first set of one or more processors, cause the system to:

determine first processed data based on the first array of data; and determine first transformed data based on the first relationship and the first processed data, wherein the first transformed data is aligned to the VFOV.

11. The system of claim 5, further comprising instructions that when executed by the first set of one or more processors, cause the system to:

determine first segmentation data based on the first array of data, wherein the first segmentation data is indicative of a set of classes for elements of the first array of data; and determine first transformed data based on the first relationship and the first segmentation data, wherein the first transformed data is aligned to the VFOV.

12. The system of claim 11, wherein the set of classes comprise:

a first class that is associated with sky, and a second class that is associated with an obstruction of the sky.

13. The system of claim 5, further comprising instructions that when executed by the first set of one or more processors, cause the system to:

determine a homography matrix that relates the first set of coordinates, with respect to the first array of data, of a plurality of AR markers in the first subset with the second set of coordinates with respect to the VFOV corresponding to markers having the same unique identifier; and wherein:

the VFOV comprises one or more planes, and the first relationship comprises the homography matrix.

14. A computer-implemented method comprising:

determining a virtual field-of-view (VFOV) that is representative of sky, wherein the VFOV comprises a cylindrical curved two-dimensional plane;

determining a first plurality of augmented reality (AR) markers, wherein each AR marker is associated with a point within the VFOV and a unique identifier;

acquiring, using a first set of sensors, first input data comprising a first array of data indicative of a portion of the sky and first pose data that is indicative of a pose associated with acquisition of the first array of data;

determining, based on the first input data, a first subset of the first plurality of AR markers that is associated with the first array of data; and determining a first relationship between the first array of data and the VFOV, based on the first subset with respect to the first array of data and the first plurality of AR markers with respect to the VFOV.

15. The computer-implemented method of claim 14, wherein the first array of data is acquired using one or more of:

a camera, a LIDAR, a depth camera, or a stereocamera; and the first pose data is acquired using one or more of:

an inertial measurement unit (IMU), a tilt sensor, or a compass.

16. The computer-implemented method of claim 14, wherein the first array of data comprises image data; and further comprising:

determining first transformed data based on the first relationship and the first array of data, wherein the first transformed data is aligned to the VFOV.

17. The computer-implemented method of claim 14, wherein the first pose data is indicative of an azimuth, an elevation, and a rotation of a first sensor used to acquire the first array of data when the first array of data is acquired.

18. The computer-implemented method of claim 14, further comprising:

determining first processed data based on the first array of data; and determining first transformed data based on the first relationship and the first processed data, wherein the first transformed data is aligned to the VFOV.

19. The computer-implemented method of claim 14, further comprising:

determining first segmentation data based on the first array of data, wherein the first segmentation data is indicative of a set of classes for elements of the first array of data, the set of classes comprising a first class that is associated with the sky and a second class that is associated with an obstruction of the sky; and determining first transformed data based on the first relationship and the first segmentation data, wherein the first transformed data is aligned to the VFOV.

20. The computer-implemented method of claim 14, further comprising:

determining a homography matrix that relates coordinates, with respect to the first array of data, of a plurality of AR markers in the first subset with coordinates, with respect to the VFOV, corresponding to AR markers having a same unique identifier; and wherein:

the first relationship comprises the homography matrix.

* * * * *